Dec. 1, 1931.  B. W. JONES  1,834,785
BUCKET HOIST CONTROL
Filed Jan. 25, 1927
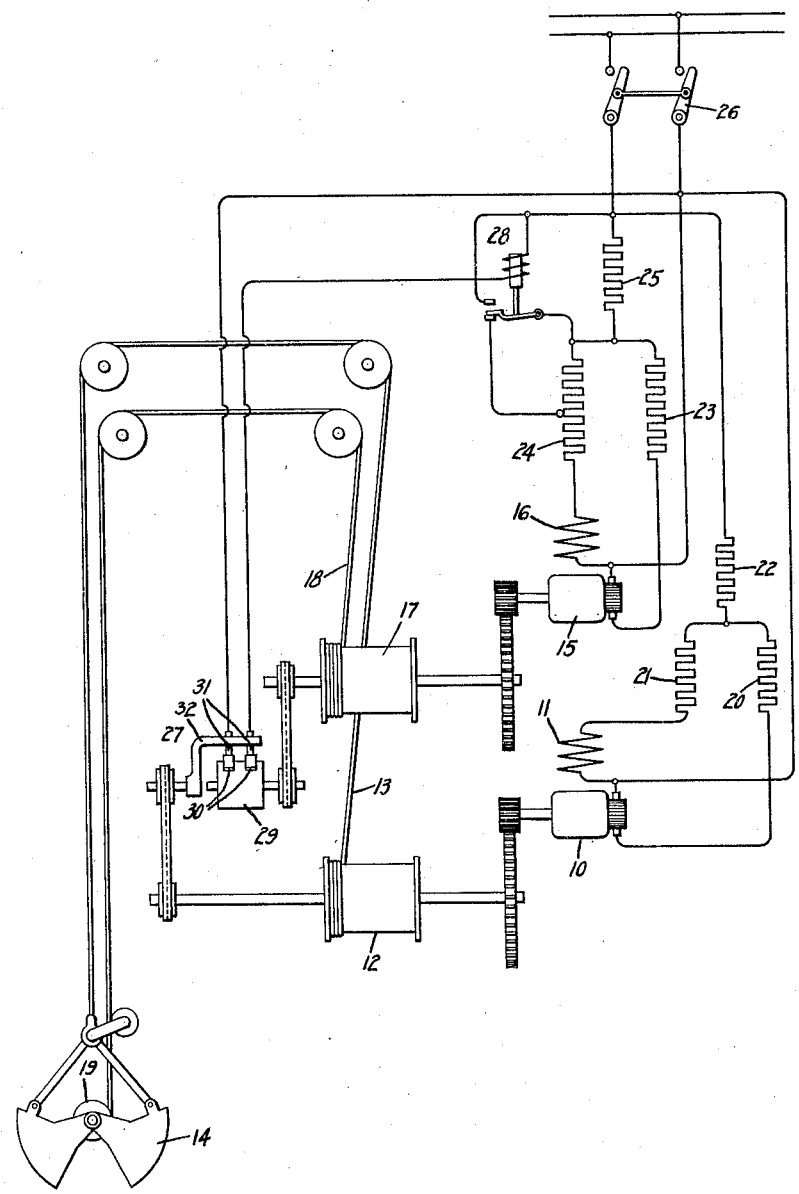
Inventor:
Benjamin W. Jones,
by
His Attorney.

Patented Dec. 1, 1931

1,834,785

UNITED STATES PATENT OFFICE

BENJAMIN W. JONES, OF SCHENECTADY, NEW YORK, ASSIGNOR TO GENERAL ELECTRIC COMPANY, A CORPORATION OF NEW YORK

BUCKET HOIST CONTROL

Application filed January 25, 1927. Serial No. 163,523.

It is customary to operate a grab bucket hoist by means of two electric motors. One of these motors is connected through a cable to the frame of the bucket and is commonly called the "shell motor" or "holding line motor". This motor is provided for raising and for governing the lowering of the bucket. The other motor is connected through a cable to the opening and closing mechanism of the bucket. This second motor is ordinarily called the "closing line" motor. In general routine work, the closing line motor closes the jaws of the bucket when the bucket has been lowered to the material to be raised. The jaws of the bucket close and cause a load of material to be retained in the bucket. The bucket is then raised by both motors being energized to operate as motors and apply a hoisting effect. When the bucket has been moved to the desired position, the load of material is dumped by deenergizing the closing line motor while the bucket is held in position, thereby permitting the jaws of the bucket to open. The empty bucket is then lowered with the jaws open and the above described operation is then repeated.

During the lowering period with the jaws of the bucket open, the closing line motor must operate as a motor so as to pay out the closing line fast enough to prevent the closing of the jaws of the bucket. During this operation the holding line motor is being overhauled by the bucket and the closing line motor is running as a motor.

It sometimes happens that it is desirable to lower a loaded bucket, and under this condition, it is customary to provide that both motors shall have a retardation effect on the bucket. This retardation effect is ordinarily obtained by causing the motors to operate as dynamic braking generators. Unless some provision is made therefor, the closing line motor may operate faster than the holding line motor and thus cause the jaws of the bucket to be opened and the material in the bucket to be spilled. Attempts have been made to take care of this condition by means of a relay energized in accordance with the generated potential of the holding line motor and cause this relay to control the closing line motor circuit so as to establish a dynamic braking action for the closing line motor. In this scheme, and others of which I am aware, there is the objection that while the motors are accelerating, the bucket will partly open due to the closing line motor operating faster than the holding line motor, and some of the material in the bucket will be spilled. In order to prevent this I have provided an improved arrangement whereby the dynamic brake connections for the closing line motor are established at the start of the lowering operation.

In carrying my invention into effect in the form which I now regard as the preferred form thereof, I control the dynamic braking connections of the closing line motor responsively to a predetermined phase relation between the holding line motor drum and the closing line drum during the lowering operation of the motor. If the jaws of the bucket are part or all of the way open, then the empty load connections are made for the closing line motor. In other words, the connections for the closing line motor are such that the closing line will pay out its cable at least as fast as the bucket is being lowered under the control of the holding line motor. If the jaws of the bucket are closed, then the dynamic braking connections for the closing line motor are established and this connection is such that the closing line motor effects a substantial retardation effect on the loaded bucket during the lowering.

A preferred way of carrying the invention into effect is shown in the accompanying drawing, which is intended merely to illustrate the principles of the invention, and which shows the lowering connections of a two motor grab bucket hoist control. A limit switch having two cooperating parts is provided, one of the parts being connected to operate synchronously with the holding line motor and its associated drum and the other element being connected to the closing line motor and its associated drum so as to be operated synchronously therewith. Electroresponsive switch mechanism for establishing the dynamic braking connections of the closing line motor is under the control of this limit switch and the arrangement is such that as long as the two elements of the limit switch are in their corresponding relative positions for the opened condition of the jaws of the bucket, the ordinary lowering connections for the closing line motor are established. In other words, the connections for the closing line motor are such that the closing line will be paid out by the closing line motor operating as a motor, the speed of paying out being at least as great as the speed of lowering of the bucket. When the jaws of the bucket are closed, the electroresponsive switch mechanism will be governed by means of the limit switch so as to establish a dynamic braking connection such that the closing line motor will give an appreciable braking effect and the jaws of the bucket will thus be prevented from opening by gravity.

The invention will be better understood by referring to the accompanying drawing, wherein the holding line motor 10 is indicated as of the direct current type having a series type field winding 11. This motor is suitably connected through gearing to the drum 12 on which the holding line or cable 13 is wound. This cable is connected as indicated to the frame of the bucket 14 and is provided for effecting the raising and for governing the lowering of the bucket. The independently operable closing line motor 15 is also indicated as of the series type having a series type field winding 16. The motor 15 is similarly connected through gearing to a drum 17 which is termed the closing line drum. The closing line 18 has one end connected to the drum 17 and its other end connected to the closing mechanism 19 of the bucket. The arrangement so far described in detail is old and well known.

Since the full control of the motors of a grab bucket hoist for effecting the lowering and raising of the bucket and control of the bucket jaws is a somewhat complicated system and since my invention resides particularly in the connections established during the lowering of the bucket, I have merely shown the lowering connections in very simple form, in order that a clear understanding of the invention may be readily had. However, it will be understood that I contemplate that my invention will be used as an element of a more complete system in which master controlling switch mechanism is provided for governing the holding line motor and the closing line motor throughout the various operations of these motors. As before stated, merely the lowering connections for the motors have been shown in very simplified form. For instance, the holding line motor 10 is indicated with its armature connected in series relation with the resistor 20 and the motor armature and resistor 20 included in multiple relation with the field winding 11, which is in turn included in series relation with the resistor 21. The multiple circuit including the motor armature and the field winding 11, is included in series relation with the resistor 22. I would have it understood that during the hoisting operation this motor will have its field winding connected in series relation with the motor armature and I would also have it understood that the resistors 20, 21 and 22 are intended to have sections thereof shunted so as to obtain a regulating effect on the motor 10. Such arrangements are common and well understood by those skilled in the art.

The closing line motor 15 is also indicated as having its armature included in series relation with a resistor 23, and the circuit including the motor armature and resistor 23 is included in multiple relation with the field winding 16 which is in turn included in series relation with the resistor 24. The resistor 25 is included in series relation with the multiple circuit just referred to, and the connections of the motor 15 are similar to the connections of the motor 10. I would also have it understood that the resistors 23, 24 and 25 are intended to be varied so as to regulate the effect of the motor 15, in a manner which is common and well understood by those skilled in the art. For controlling the closing of the connection of the motors 10 and 15 to the source of supply, I have merely indicated a manually operated switch 26. I would have it understood that in practice this switch will ordinarily be an electro-magnetically operated device and be opened and closed under the control of a suitable master switch. However, such control has not been shown, since it is not of the essence of the invention and is of itself quite common and well known.

The means which I have provided for preventing the opening of the jaws of the bucket when lowering a loaded bucket, takes the form of a limit switch 27 which controls an electromagnetic switch or contactor 28 and thereby controls the establishment of braking connections for the closing line motor 15. This limit switch 27 has two parts, one a drum 29 connected to be rotated synchronously with the drum 17 and having thereon the two segments 30 and the other part comprises the brushes 31 which cooperate with the segments 30 and which are carried by the rotatable arm 32. This arm 32 is operated synchronously with the shell motor drum 12, in any suitable manner.

As thus constructed and arranged and with their parts in their respective positions indicated in the drawing, the operation of my invention is as follows: In order to lower the bucket 14, the line switch 26 will first be closed and thereby energize the motors 10 and 15 from the source of supply. Because of the fact that the drums 12 and 17 are in their relative positions corresponding to the jaws of the bucket 14 being open, the brushes 31 will be in engagement with the segments 30 of the limit switch and the contactor 28 will be energized to operate and establish connections for the motor 15 in which the resistor 25 is shunted and all of the resistor 24 included in the circuit of field winding 16. The resistors 23 and 24 associated with motor 15 are adjusted so that this motor will operate as a motor, paying out the closing line 18 at such a speed as to keep up with the lowering of the bucket under the control of the motor 10. When the bucket is thus lowered to the material, the motors 10 and 15 will be deenergized and the motor 15 will be connected to operate as a series motor and thus cause the jaws of the bucket to be closed. As before stated, systems whereby the motors are thus governed are old and well understood and the means whereby these connections are established have not been shown. When the jaws of the bucket are closed and a load of material is held in the bucket, both motors 10 and 15 are energized to operate as series motors under the control of means which have also not been shown for similar reasons.

In case the bucket has been thus raised and it is desired to lower the loaded bucket, the features of the present invention are brought into play to prevent the opening of the jaws of the bucket. With the lowering connections established as are indicated in the drawing, and the jaws of the bucket in their closed relation, there will be a relative movement between the brushes 31 and the segments 30 of the limit switch 27, such that the contactor 28 will be deenergized and caused to assume its position as indicated in the drawing.

In this position the contactor 28 shunts a portion of resistor 24 included in circuit with the winding 16 of motor 15 and thus causes a relatively high field energization for the motor 15. This establishes in effect a dynamic braking connection for the motor 15 such that it will introduce a very substantial retarding effect on the bucket. Two advantages are thereby secured. In the first place, the jaws of the bucket are prevented from opening and spilling the contents of the bucket, and in the second place, the closing line motor assists the motor 10 very materially in governing the lowering of the loaded bucket.

When the jaws of the bucket are in their open position as indicated, the parts of the limit switch 27 will be in their respective positions indicated in the drawing and the contactor 28 will be energized to make engagement with its upper set of contacts and establish a connection in which the resistor 25 is shunted and all of the resistor 24 is included in series relation with the field winding 16 of motor 15, the resistor 23 being in series relation with the armature of this motor. As before explained, this connection is such that the motor 15 will operate as a motor and pay out the cable fast enough to keep up with the lowering of the bucket under the control of the motor 10, so as to thereby prevent the jaws of the bucket being closed while the bucket is being lowered.

What I claim as new and desire to secure by Letters Patent of the United States, is:

1. In a bucket hoist, a drum and a cable connected thereto for hoisting and for governing the lowering of the bucket, a second independently operable drum and a closing line connected thereto for governing the opening and the closing of the bucket, and automatic means dependent for operation on the bucket being in a closed condition at the beginning of the lowering of the bucket for limiting the paying out of the closing line from said second drum to prevent the opening of the bucket.

2. In a bucket hoist, a drum and a holding line connected thereto for hoisting and for governing the lowering of the bucket, a second independently operable drum and a closing line connected thereto for governing the opening and the closing of the bucket, and means automatically operated in dependence on the bucket being in the closed position at the beginning of the lowering of the bucket for limiting the rate of unwinding of the closing line from said second drum to a rate which does not exceed the rate of unwinding of the holding line from said first drum.

3. In a bucket hoist, a shell motor, an independently operable closing line motor, and automatic means dependent for operation on the bucket being in a closed condition during the lowering of the bucket for causing a braking effect to be applied by said closing line motor during the lowering of the bucket to prevent the opening of the bucket.

4. In a bucket hoist, a drum and a holding line connected thereto for hoisting and for governing the lowering of the bucket, an electric motor for operating said drum, a second independently operable drum and a closing line connected thereto for governing the opening and the closing of the bucket, a motor for operating said second drum, bucket lowering connections for said motors whereby said first motor operates as a braking generator and said second motor operates as a motor during the lowering of an empty bucket, and means automatically operated in dependence on the bucket being closed for causing the said second motor to exert a braking effect during the lowering of the bucket which prevents the opening of the bucket.

5. In a bucket hoist, a drum and a holding line connected thereto for hoisting and for governing the lowering of the bucket, a second independently operable drum and a closing line connected thereto for governing the opening and the closing of the bucket, and a device having relatively movable cooperating parts respectively connected to be operated synchronously with a corresponding drum for controlling the paying out of the closing line during the lowering of the bucket to prevent the opening of the bucket.

6. In a bucket hoist, a drum and a holding line connected thereto for hoisting and for governing the lowering of the bucket, an electric motor for operating said drum, a second independently operable drum and a closing line connected thereto for governing the opening and the closing of the bucket, a second motor for operating said second drum, a limit switch having relatively movable cooperating parts respectively connected to be operated synchronously with a corresponding drum, and switch mechanism operated under the control of said limit switch for controlling said second motor during the lowering of the bucket in a closed condition for causing said second motor to limit the paying out of the closing line from said second drum to prevent the opening of the bucket.

In witness whereof, I have hereunto set my hand this 24th day of January, 1927.

BENJAMIN W. JONES.